US006208382B1

(12) United States Patent
Glenn

(10) Patent No.: US 6,208,382 B1
(45) Date of Patent: Mar. 27, 2001

(54) COLOR VIDEO PROCESSING SYSTEM AND METHOD

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 0 days.

(21) Appl. No.: 09/152,395

(22) Filed: Sep. 14, 1998

Related U.S. Application Data
(60) Provisional application No. 60/094,499, filed on Jul. 29, 1998, and provisional application No. 60/094,500, filed on Jul. 29, 1998.

(51) Int. Cl.[7] .................................................. H04N 7/01
(52) U.S. Cl. .................. 348/448; 348/443; 348/449; 348/450; 348/451; 348/452; 348/458
(58) Field of Search .................................. 348/443, 448, 348/449, 450, 451, 452, 458

(56) References Cited

U.S. PATENT DOCUMENTS

| | | | |
|---|---|---|---|
| 4,149,182 | 4/1979 | Yamanaka et al. | 358/43 |
| 4,425,581 | 1/1984 | Schweppe et al. | 358/148 |
| 4,598,309 | * 7/1986 | Casey | 358/11 |
| 4,612,567 | * 9/1986 | Pritchard | 358/11 |
| 4,636,857 | 1/1987 | Achiha et al. | 358/140 |
| 4,639,763 | * 1/1987 | Willis | 358/11 |
| 4,652,909 | 3/1987 | Glenn | 358/41 |
| 4,667,226 | 5/1987 | Glenn | 358/41 |
| 4,701,783 | 10/1987 | Glenn | 368/12 |
| 4,733,299 | 3/1988 | Glenn | 358/41 |
| 4,823,186 | 4/1989 | Muramatsu | 358/43 |
| 4,876,591 | 10/1989 | Muramatsu | 358/43 |
| 5,025,394 | 6/1991 | Parke | 364/518 |
| 5,221,963 | 6/1993 | Hashimoto et al. | 348/234 |

(List continued on next page.)

FOREIGN PATENT DOCUMENTS

WO98/16068 4/1988 (WO).

OTHER PUBLICATIONS

W.E. Glenn, and J.W. Marcinka, "The Development of 1080 × 1920 Pixel Color CCD Camera Progressively Scanned At 60 Frames Per Second," SMPTE Technical Conference, Los Angeles, CA, Oct. 9, 1996.

W.E. Glenn, and J.W. Marcinka, "1920 × 1080 Pixel Color Camera With A Progressive Scan Output At 60 FPS," SMPTE Technical Conference, New York, NY, Nov. 22, 1997.

(List continued on next page.)

Primary Examiner—Michael Lee
Assistant Examiner—Brian P. Yenke
(74) Attorney, Agent, or Firm—Martin Novack

(57) ABSTRACT

Method and apparatus are disclosed for receiving an interlaced color video signal, and processing the signal to produce a progressively scanned video signal. An embodiment of the method of the invention includes the following steps: scan converting, by field combining and high pass filtering, the luminance component of the received signal, to obtain a progressively scanned high pass luminance component; deriving, from the luminance component of the received signal, a low pass luminance component; scan converting, by line rate conversion, to progressively scanned format, the chrominance components of the received signal and the low pass luminance component; and combining the progressively scanned low and high pass luminance components. In a disclosed embodiment, the step of deriving, from the luminance component of the received signal, a low pass luminance component, comprises scan converting the progressively scanned high pass luminance component to an interlaced scanned high pass luminance component, and subtracting the interlaced scanned high pass luminance component from the luminance component of the received signal to obtain the low pass luminance component.

17 Claims, 2 Drawing Sheets

U.S. PATENT DOCUMENTS

| | | | | |
|---|---|---|---|---|
| 5,257,103 | * | 10/1993 | Vogeley et al. | 358/140 |
| 5,260,786 | * | 11/1993 | Kawashima | 358/140 |
| 5,325,125 | | 6/1994 | Naimpally et al. | 348/402 |
| 5,337,089 | * | 8/1994 | Fisch | 348/446 |
| 5,414,465 | | 5/1995 | Kodama et al. | 348/236 |
| 5,534,935 | * | 7/1996 | Kawai | 348/448 |
| 5,568,193 | | 10/1996 | Kawahara | 348/222 |
| 5,596,418 | | 1/1997 | Strolle et al. | 386/9 |
| 5,717,466 | * | 2/1998 | Pan | 348/450 |
| 5,754,245 | * | 5/1998 | Yoshida | 348/451 |
| 5,781,241 | | 7/1998 | Donovan | 348/441 |
| 5,786,871 | | 7/1998 | Penney | 348/609 |
| 5,838,394 | * | 11/1998 | Kajimoto | 348/717 |
| 5,936,676 | * | 8/1999 | Ledinh | 348/452 |
| 6,040,868 | * | 3/2000 | Jun | 348/448 |

OTHER PUBLICATIONS

Glenn et al. "Subband Coding Compression System For Program Production", presented at the 136th SMPTE Technical Conference in Los Angeles, CA, in Oct., 1994.

Glenn et al. "Simple Scalable Video Compression Using 3–D Subband Coding", presented at the SMPTE Advanced Television and Electronic Imaging Conference in San Francisco, CA, on Feb. 11, 1995, and published in the Mar., 1996 SMPTE Journal.

W.E. Glenn, K.G. Glenn, and T.L. Glatt, "Logarithmic A/D Converters Used in Video Signal Processing Systems," presented at the 132nd SMTE Technical Conference, New York, Oct. 1990. Reprinted in SMPTE Journal vol. 101/5:329–333, May 1992.

D.C. Livingston, "Colorimetric Analysis of the NTSC Color Televison Systems," Proceedings of the IRE, 42:138–150, Jan. 1054.

Yuichi Ninomiya, et al., "An HDTV Broadcasting System Utilizing a Bandwidth Compression Technique—MUSE," IEEE Transactions on Broadcasting, vol. BC–33/4:130–160, Dec. 1987.

V.A. Billock and T.H. Harding, "The Number and Tuning of Channels Responsible for the Independent Detection of Temporal Modulation, "ARVO, Investigative Ophthalomogy & Visual Sicnec, Annual Meeting Abstracts, 32:840, Mar. 15, 1991.

W.E. Glenn, "Digital Image Compression Based On Visual Perception And Scene Properties", Presented at the 133rd SMPTE Technical Conference in Los Angeles on Oct. 27, 1991, and published in the May, 1993, SMPTE Journal.

W.E. Glenn, "Digital Image Compression Based On Visual Perception, *Digital Images & Human Vision*", edited by Andrew B. Watson, (Cambridge: MIT Press, 1993): 63:71.

* cited by examiner

COLOR VIDEO PROCESSING SYSTEM AND METHOD

RELATED APPLICATIONS

The present Application claims priority from U.S. Provisional Patent Application No. 60/094,499, filed Jul. 29, 1998 and from U.S. Provisional Patent Application No. 60/094,500, filed Jul. 29, 1998, and said Provisional Patent Applications are incorporated herein by reference.

FIELD OF THE INVENTION

This invention relates to processing and display of television signals and, more particularly, to an improved method and apparatus for receiving an interlaced color video signal and processing the received signal to produce a progressively scanned video signal.

BACKGROUND OF THE INVENTION

In my Published PCT Patent Application WO 98/16068, there is disclosed a type of camera that uses two image sensors and can produce an output of 1920×1080 pixels in color progressively scanned at 60 frames per second. [see, also, W. E. Glenn, and J. W. Marcinka, "1920×1080 Pixel Color Camera With A Progressive Scan Output AT 60 FPS," invited paper presented at SMPTE Technical Conference, New York, N.Y., Nov. 22, 1997.] This is the "top" format in the SMPTE 274M standard. Using progressive scan rather than interlace has been a long-term objective for program production for many years. Progressive scan is widely used in computers having high definition displays. As television and computer practices converge, progressive scan display becomes more desirable. Displays such as plasma panels and light valve systems require progressive scan if they are to have full brightness and optimum motion rendition. Such displays are becoming increasingly important for high definition television.

In operation of the referenced camera system, one sensor in the camera is a color stripe filter sensor that is scanned interlaced two lines at a time to produce the color signals and low resolution luminance. Within the camera, the top octave of detail is scanned out of a second sensor at 30 frames per second. An interlaced camera also takes ⅓₀ second to produce the top octave of vertical detail. Both cameras produce all other spatial frequencies at 60 frames per second. Consequently, motion rendition for the referenced camera is the same as that of an interlaced camera. This was verified subjectively by comparing the two types of cameras at 525 lines where cameras were commercially available and progressively scanned at 60 frames per second. [See, W. E. Glenn, and J. W. Marcinka, "The Development Of 1080× 1920 Pixel Color CCD Camera Progressively Scanned At 60 Frames Per Second," invited paper presented at SMPTE Technical Conference, Los Angeles, Calif., Oct. 9, 1996.]

The 1080P image derived from the referenced camera system does not have the interlace artifacts, and there is no interline flicker or line crawl. The vertical resolution is 1000 lines on a test chart, as compared with 700 lines for an interlaced camera.

In order to transmit a video signal that is within existing ATSC transmission standards, the output of the referenced camera system can be converted to interlaced format (e.g. to 1080I).

It is among the objects of the present invention to provide a method and apparatus for processing an interlaced signal, such as the converted 1080I signal, to produce a progressively scanned video signal.

SUMMARY OF THE INVENTION

The present invention is directed to a method and apparatus for receiving an interlaced color video signal, and processing the signal to produce a progressively scanned video signal. An embodiment of the method of the invention includes the following steps: scan converting, by field combining and high pass filtering, the luminance component of the received signal, to obtain a progressively scanned high pass luminance component; deriving, from the luminance component of the received signal, a low pass luminance component; scan converting, by line rate conversion, to progressively scanned format, the chrominance components of the received signal and the low pass luminance component; and combining the progressively scanned low and high pass luminance components.

In a form of the invention, the step of deriving, from the luminance component of the received signal, a low pass luminance component, comprises scan converting the progressively scanned high pass luminance component to an interlaced scanned high pass luminance component, and subtracting the interlaced scanned high pass luminance component from the luminance component of the received signal to obtain the low pass luminance component.

In a preferred embodiment of the invention, the line rate conversion comprises repeating each line, or interpolated lines, two times at twice the original clock rate of the line. In this embodiment, the scan converting, by field combining, to progressive format, includes clocking out at a higher rate than is used for clocking in.

Also in a preferred embodiment of the invention, the received interlaced color signal includes received red and blue chrominance components, $C_R$ and $C_B$, respectively, and a received luminance component, Y, and the progressively scanned video signal includes, as an output luminance component, the combined low pass and high pass luminance components, and, as output chrominance components, the scan converted red and blue chrominance components.

Further features and advantages of the invention will become more readily apparent from the following detailed description when taken in conjunction with the accompanying drawings.

DETAILED DESCRIPTION

Figure 1:
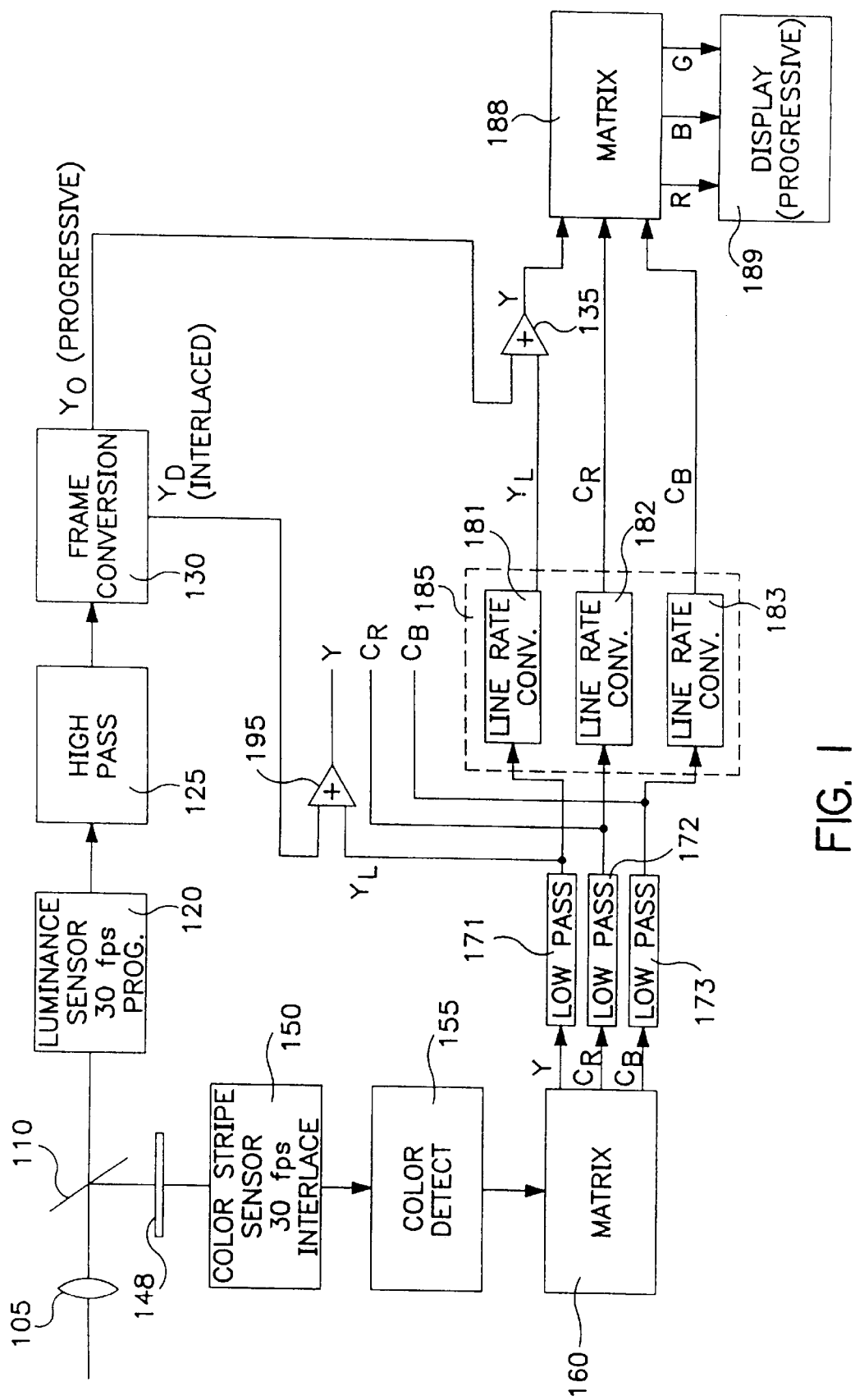
FIG. 1 is a diagram, partially in schematic and partially in block form, of an example of a camera system that can produce interlaced color video signals that can be subsequently processed using an embodiment of the invention.

FIG. 1 shows a camera system of the type set forth in my Published PCT Application WO 98/160068, which can produce for example a 1080 progressive video signal, which has been modified to produce an interlaced video signal, for example a 1080 interlaced video signal. Light received from a scene being viewed (i.e., a scene which can be moving) is focused by a camera lens system, represented at 105, through a splitter, e.g. a half-silvered mirror 110, onto image sensors 120 and 150, respectively. The sensor 120, in this example, has 1080 lines and 1920 pixels per line, and is progressively scanned at 30 frames per second. The output of CCD sensor 120 is coupled to a high pass spatial filter 125, the output of which is coupled to a frame rate conversion circuit 130. It is known, in general, that a frame of video information can be digitized and clocked in at one rate (e.g. 30 frames per second, in the example of the present embodiment) and clocked out at a higher rate (e.g. 60 frames per second, in the example of the present embodiment) by using frame stores that clock out at twice the rate at which they are clocked in, with each original frame being clocked out twice during one original frame period. A type of circuit that can be employed is disclosed in the above referenced published PCT Application No. WO 98/16068. Reference can also be made to my U.S. Pat. No. 4,701,783. In the present example, the line rate of the converted frames is 1080 visible lines per frame times 60 frames per second, which equals 64,800 visible lines per second. [The full line rate for this case will be 1125 lines per frame, which gives 67,500 total lines per second.] The output of the frame rate conversion circuit 130, designated $Y_D$, is coupled to one input of a summing circuit 135. The other sensor 150 of the FIG. 1 example is another CCD sensor, having the same 1920 by 1080 pixel and line structure, but operated with color stripes, as is known in the art for producing color component signals. In the optical path of this sensor, an optical low-pass filter (represented at 148) can be interposed to prevent alias frequencies from being generated by the low spatial frequency sampling. In the example of FIG. 1, the sensor 150 is operated to be scanned at 30 interlaced frames per second. The output of sensor 150 is coupled to the block 155 and then block 160, which respectively represent conventional types of circuits for color detection (block 155) and for generating luminance and color difference signals (the matrix of block 160). The outputs of matrix circuit 160, in the present example, are a luminance signal, designated $Y_L$, and chrominance components $C_R$ and $C_B$ (which can be color difference signals R-$Y_L$ and B-$Y_L$, respectively). Each of these signals is coupled to a respective low-pass spatial filter, the filters being respectfully designated 171, 172 and 173. The outputs of the low-pass spatial filters are coupled to respective line rate conversion circuits 181, 182 and 183 (collectively labelled as scan conversion circuit 185, in dashed line), which are described in further detail in the above referenced published PCT Application No. WO 98/16068. In the present example, each line is clocked out at twice its original rate for two successive lines, so the result will be 60 progressive frames of 1080 visible lines each; i.e., again a line rate of 64,800 visible lines per second (and a full line rate of 67,500 lines per second). Line interpolation can be used to advantage in the conversion. [In this example, and in similar configurations, it will be understood that there must be a line reverse to account for the mirror image resulting from mirror 110. If this is not implemented by reading out the sensor lines in reverse order, it can be readily performed by clocking out on a last in first out basis in the line rate conversion circuit.] The output of line rate conversion circuit 181 is coupled to a second input of summing circuit 135 which produces an output luminance signal designated Y. The signals Y, $C_B$, and $C_R$ can be matrixed using matrix circuit 188 to obtain R, G, B color signals for display using 1080 line progressive display. It will be understood that appropriate compensating delay can be provided in one or both channels, as required.

In operation of the FIG. 1 camera system as described so far (see also published PCT Application No. WO 98/16068), it is seen that the described system and technique achieves color video signals at the higher progressive scan rate (60 frames per second, progressive, in this example), at the full line capability of the sensors used, and without undue introduction of artifacts. In the output of the camera system, everything but the top octave of luminance detail is updated at 60 frames per second. The detail information is updated at 30 frames per second (as it is in interlaced scans, but without the interlace artifacts).

The camera system of FIG. 1 can also be used to produce interlaced video signals without noticeable motion artifacts. Specifically, an interlaced video signal output includes the interlaced lower band chrominance signals $C_R$ and $C_B$, as well as a luminance signal Y that is the sum (see adder 195) of the lower band color-derived luminance component, $Y_L$, and the high band (detail) luminance component, $Y_D$, obtained by conversion to interlace at half the clock rate (e.g. using a frame store in conversion circuit 130), with the odd lines being clocked out during one field and the even lines clocked out during the next field.

Figure 2:
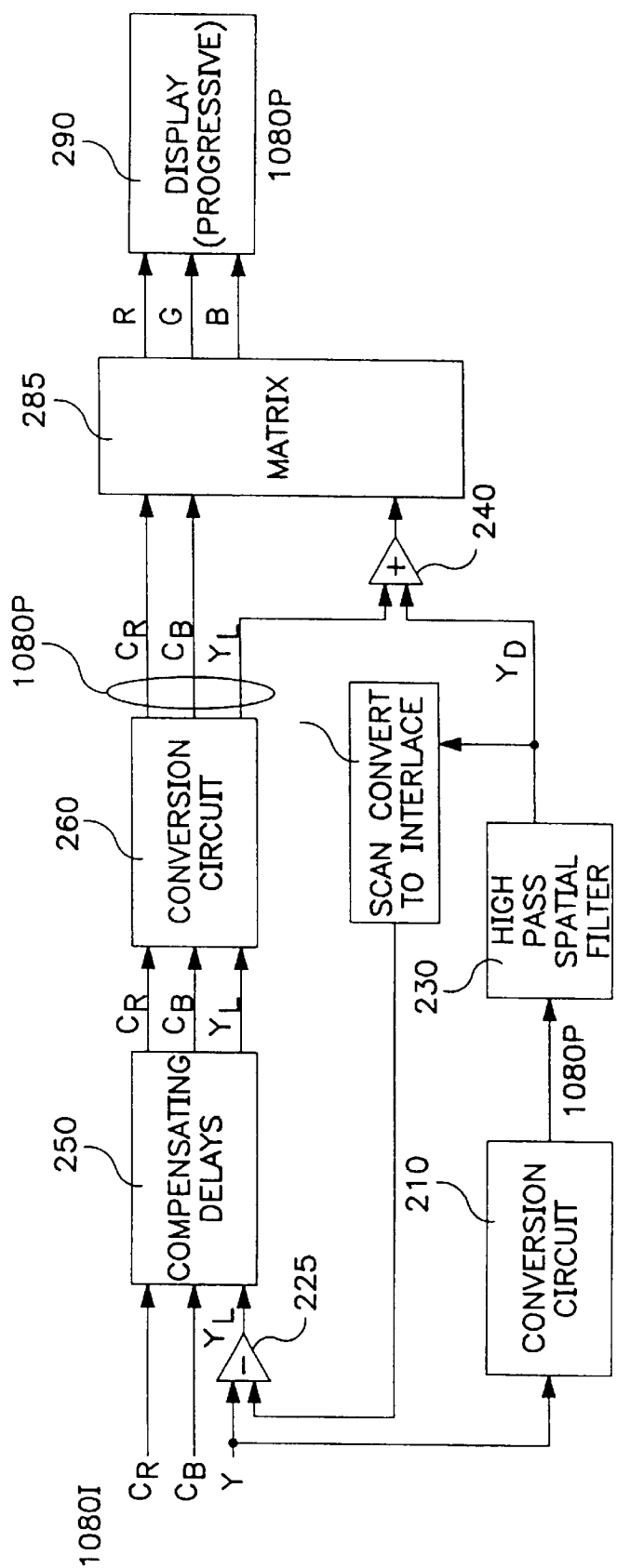
FIG. 2 is a diagram, partially in schematic and partially in block form, of a video processing apparatus in accordance with an embodiment of the invention and which can be used in practicing an embodiment of the method of the invention.

FIG. 2 shows an embodiment of an interlaced to progressive receiver converter in accordance with an embodiment of the invention. A 1080 line interlaced signal is loaded into a frame store (or frame stores) in frame conversion circuit 210 so that the two fields produce a frame every 1/30 second. This can be implemented by keeping track of the fields so that an odd field and then an even field are read into the frame store. This is the same frame of information, as far as the detail signal is concerned, as was derived from the progressively scanned sensor (which scans a frame every 1/30 second) in the camera system. This frame of information, clocked out at 60 fps progressive, then goes through a high-pass spatial filter 230 to filter out all of the low spatial frequency information and leave detail at 30 frames per second. As in the camera, this frame is time-base corrected and repeated to give two frames of detail 60 frames per second progressively scanned. The current field of 1080I signal contains the low spatial frequency information and the chrominance signals. It also contains low spatial frequency alias frequencies that resulted from the interlaced scanning of the detail luminance in the camera. The detail luminance is scan converted to 1080I by scan converter 222 as it was in the camera system. This contains the scan converted luminance detail plus the low spatial frequency alias frequencies generated from the scan converter process of detail in the camera. This signal is subtracted from the interlaced luminance signal by subtraction circuit 225, leaving only the low resolution luminance that is an exact replica of the low resolution luminance out of the color stripe sensor in the camera system. This signal does not contain interlace alias frequencies because of the low-pass optical filter that precedes the sensor in the camera. Both of these are passed through respective compensating delays 250 to compensate for the delay in the frame store of the detail conversion circuit, and then time-base corrected and line interpolated (conversion circuit 260) to give low-resolution signals in the 1080P format. The detail luminance component $Y_D$ is then added (adder 240) to the low-resolution luminance component $Y_L$ to give the full resolution 1080P luminance signal. This signal is now an exact replica of the 1080P output from the camera. The progressively scanned signals are matrixed using matrix circuit 285 to obtain color signals R, G, B, and these are displayed using a 1080P display 290.

As long as any compression system used preserves the 1080I original signal faithfully, a standard MPEG or motion JPED compression system can be used. This means that 1080P signals from the camera can be transmitted using a standard 1080I transmission format. 1080I receivers will display it with the same quality as film scanned at 1080I. 1080P receivers will display it without interlace artifacts.

A 1080P receiver will also scan convert the signal from a standard 1080I source to the 1080P format. This will eliminate interline flicker and line crawl. For a standard 1080I camera, the vertical resolution will still be 700 rather than 1000 lines. Film scanned at 1080I would have the full 1000 line resolution.

As with film scans at 1080I, the camera output will have more interline flicker if displayed on a 1080I receiver than a signal from a 1080I camera. It may be desirable to slightly attenuate the detail signal until this artifact is acceptable on a 1080I display and boost it back up for the 1080P display. Current practice for film scanning is to do the same thing by slightly defocusing the scanner depending on program material. This would degrade the S/N ratio for the 1080P display, but with digital transmission the S/N ratio is still good. Such "fine tuning" concept could be done empirically.

In summary, the present invention incudes a method of processing 1080I signals that either originate on film or are scan converted from the disclosed 1080P camera so that it can be displayed at 1080P in the receiver. This process has all of the advantages of a full 1080P system (improved vertical resolution, no line crawl, and no interline flicker). Preferably, the video signals should originate from the disclosed type of camera or film. If a conventional 1080I camera were used, moving edges would have zig-zags.

What is claimed is:

1. A method for receiving an interlaced color video signal, and processing said signal to produce a progressively scanned video signal, comprising the steps of:

scan converting, by field combining and high pass filtering, the luminance component of the received signal, to obtain a progressively scanned high pass luminance component;

deriving, from said luminance component of the received signal, a low pass luminance component;

scan converting, by line rate conversion, to progressively scanned format, the chrominance components of the received signal and said low pass luminance component; and combining the progressively scanned low and high pass luminance components.

2. The method as defined by claim 1, wherein said step of deriving, from said luminance component of the received signal, a low pass luminance component, comprises: scan converting the progressively scanned high pass luminance component to an interlaced scanned high pass luminance component, and subtracting said interlaced scanned high pass luminance component from the luminance component of the received signal to obtain said low pass luminance component.

3. The method as defined by claim 1, wherein said line rate conversion comprises repeating interpolated lines two times at twice the original clock rate of the line.

4. The method as defined by claim 2, wherein said line rate conversion comprises repeating interpolated lines two times at twice the original clock rate of the line.

5. The method as defined by claim 1, wherein said scan converting, by field combining, to progressive format, includes clocking out at a higher rate than is used for clocking in.

6. The method as defined by claim 2, wherein said scan converting, by field combining, to progressive format, includes clocking out at a higher rate than is used for clocking in.

7. The method as defined by claim 4, wherein said scan converting, by field combining, to progressive format, includes clocking out at a higher rate than is used for clocking in.

8. The method as defined by claim 1, wherein said received interlaced color video signal includes received red and blue chrominance components, $C_R$ and $C_B$, respectively, and a received luminance component, Y and wherein said progressively scanned video signal includes, as an output luminance component, the combined low pass and high pass luminance components, and, as output chrominance components, the scan converted red and blue chrominance components.

9. The method as defined by claim 2, wherein said received interlaced color video signal includes received red and blue chrominance components, $C_R$ and $C_B$, respectively, and a received luminance component, Y and wherein said progressively scanned video signal includes, as an output luminance component, the combined low pass and high pass luminance components, and, as output chrominance components, the scan converted red and blue chrominance components.

10. The method as defined by claim 4, wherein said received interlaced color video signal includes received red and blue chrominance components, $C_R$ and $C_B$, respectively, and a received luminance component, Y and wherein said progressively scanned video signal includes, as an output luminance component, the combined low pass and high pass luminance components, and, as output chrominance components, the scan converted red and blue chrominance components.

11. The method as defined by claim 8, further comprising matrixing said output luminance component and said output chrominance components to produce output color signals.

12. The method as defined by claim 11, wherein said output color signals are R, B, G color signals.

13. The method as defined by claim 12, further comprising displaying said output color signals.

14. Apparatus for receiving an interlaced color video signal, and processing said signal to produce a progressively scanned video signal, comprising:

means for scan converting, by field combining and high pass filtering, the luminance component of the received signal, to obtain a progressively scanned high pass luminance component;

means for deriving, from said luminance component of the received signal, a low pass luminance component;

means for scan converting, by line rate conversion, to progressively scanned format, the chrominance components of the received signal and said low pass luminance component; and means for combining the progressively scanned low and high pass luminance components.

15. Apparatus as defined by claim 14, wherein said means for deriving, from said luminance component of the received signal, a low pass luminance component, comprises: means for scan converting the progressively scanned high pass luminance component to an interlaced scanned high pass luminance component, and means for subtracting said interlaced scanned high pass luminance component from the luminance component of the received signal to obtain said low pass luminance component.

16. Apparatus as defined by claim 14, further comprising means for displaying said progressively scanned video signal.

17. Apparatus as defined by claim 15, further comprising means for displaying said progressively scanned video signal.

* * * * *

UNITED STATES PATENT AND TRADEMARK OFFICE
CERTIFICATE OF CORRECTION

PATENT NO.    : 6,208,382 B1
DATED         : March 27, 2001
INVENTOR(S)   : William E. Glenn It is certified that error appears in the above-identified patent and that said Letters Patent is hereby corrected as shown below:

Column 1,
Line 10, insert the following new paragraph:

-- The present invention was made with Government support, and the Government has certain rights in the invention. --

Signed and Sealed this

Third Day of December, 2002

JAMES E. ROGAN
*Director of the United States Patent and Trademark Office*